(12) United States Patent
Nettles et al.

(10) Patent No.: US 9,758,384 B2
(45) Date of Patent: Sep. 12, 2017

(54) BUBBLE SIZE MINIMIZING INTERNALS FOR FLUIDIZED BED REACTORS

(71) Applicant: Mitsubishi Polycrystalline Silicon America Corporation (MIPSA), Theodore, AL (US)

(72) Inventors: Bryan Nettles, Mobile, AL (US); Matthias Colomb, Theodore, AL (US); Rick Deckbar, Theodore, AL (US)

(73) Assignees: Mitsubishi Polycrystalline Silicon America Corporation (MIPSA), Theodore, AL (US); MITSUBISHI MATERIALS CORPORATION, Tokyo (JP)

( * ) Notice: Subject to any disclaimer, the term of this patent is extended or adjusted under 35 U.S.C. 154(b) by 191 days.

(21) Appl. No.: 14/556,590

(22) Filed: Dec. 1, 2014

(65) Prior Publication Data
US 2016/0152482 A1 Jun. 2, 2016

(51) Int. Cl.
*C01B 33/107* (2006.01)
*B01J 8/18* (2006.01)

(52) U.S. Cl.
CPC ....... *C01B 33/10763* (2013.01); *B01J 8/1809* (2013.01); *B01J 8/1872* (2013.01); *B01J 2208/0084* (2013.01); *B01J 2208/00938* (2013.01); *B01J 2208/00991* (2013.01)

(58) Field of Classification Search
CPC ........ B01J 8/1809; B01J 8/1872; B01J 8/382; B01J 2208/00991; B01J 2208/0084; B01J 2208/00938; C01B 33/10763
See application file for complete search history.

(56) References Cited

U.S. PATENT DOCUMENTS 2,893,849 A * 7/1959 Krebs ..................... B01J 8/1872
34/369
2003/0194356 A1* 10/2003 Meier ................ B01D 53/0407
422/141

* cited by examiner

*Primary Examiner* — Lessanework Seifu
(74) *Attorney, Agent, or Firm* — Locke Lord LLP

(57) ABSTRACT

The present invention relates to internals useful for minimizing bubble size in a bubbling fluidized bed reactor. One use for the invention is in an apparatus and method for producing trichlorosilane in which metallurgical grade silicon is reacted with hydrogen chloride gas and while being fluidized by the hydrogen chloride gas, thereby producing trichlorosilane.

6 Claims, 6 Drawing Sheets

BUBBLE SIZE MINIMIZING INTERNALS FOR FLUIDIZED BED REACTORS

BACKGROUND OF THE INVENTION

Field of the Invention

The present invention relates to internals useful for minimizing bubble size in a bubbling fluidized bed reactor. One use for the invention is in an apparatus and method for producing trichlorosilane in which metallurgical grade silicon powder is reacted with hydrogen chloride gas while being fluidized by the hydrogen chloride gas, thereby producing trichlorosilane.

Description of Related Art

Trichlorosilane ($SiHCl_3$) used as a raw material for producing high purity silicon may be produced by reacting metallurgical grade silicon powder of about 98% purity and hydrogen chloride gas.

The apparatus for producing trichlorosilane includes a reactor, a raw material supply device for supplying Me-Si to the reactor, and a gas introduction device for introducing hydrogen chloride gas. In the apparatus, the Me-Si inside the reactor is reacted with hydrogen chloride gas while being fluidized with the hydrogen chloride gas, and the generated gas containing trichlorosilane is discharged from the upper part of the reactor. Conventionally, a heat transfer tube extending in the reactor through which a heating medium is heated in a tortuous path is provided inside the reactor. Also conventionally, internals or more specifically gas flow controlling members, shaped as tubes or rods, extend at least part of the length of the reactor so the growth of bubbles of the ascending gas is suppressed.

SUMMARY OF THE INVENTION

Typically, Me-Si is fluidized at a lower part of a reactor by ascending hydrogen chloride gas which is introduced at the lower part and the Me-Si is contacted with the hydrogen chloride gas to cause a reaction during fluidization. The hydrogen chloride gas ascends as bubbles from the lower part to the upper part in the fluidized bed of the Me-Si. However, in the meantime, the bubbles become greater in size (volume) at the upper part of the reactor than at the lower part thereof. When the bubbles of hydrogen chloride gas grow greater in size, there is a decrease in the contact area of the bubbles of hydrogen chloride gas with the Me-Si, resulting in a lower efficiency of the reaction. However, the bubbles contact with (or collide against) the gas flow controlling members and the heat transfer tube inserted into the reactor along the vertical direction and are suitably divided, thereby allowing a more effective reaction of the hydrogen chloride gas with the Me-Si.

In order to obtain fine bubbles of hydrogen chloride gas the gas flow controlling members and heat transfer tube may be disposed as close to the center of the reactor as possible. However, in this case, the Me-Si collides against the outer surface of the heat transfer tube along with the hydrogen chloride gas, so that erosion is likely to occur on the heat transfer tube.

The present invention has been made in view of the above situation, an object of which is to provide an apparatus and method for producing trichlorosilane in which hydrogen chloride gas introduced from the bottom part of the reactor contributes effectively to a reaction even at the upper part of the reactor, thereby attaining a higher reaction efficiency.

The apparatus for producing trichlorosilane of the present invention comprises a reactor; a raw material supply device that supplies Me-Si as raw material to the reactor; a gas introduction device that introduces hydrogen chloride gas to the reactor so that the hydrogen chloride gas reacts with the Me-Si while the Me-Si is fluidized by the hydrogen chloride gas; a gas discharge device that discharges generated gas containing trichlorosilane from the reactor; a plurality of internals elements including a plurality of baffles connected to supports installed in a central space of the reactor along the vertical direction; and optionally a heat transfer tube which is installed in the reactor and through which a heating medium passes.

Inside the reactor, the reaction takes place most actively at the lower part thereof and raises the temperature therein. Further, since hydrogen chloride gas also ascends from the lower part of the reactor, an upward flow takes place in a fluidized bed where currents ascend in the vicinity of the center of the reactor. In addition, the upward flow passes through a space between different baffles which are connected to the supports. Therefore, as the upward flow contacts with (or collide against) the baffles connected to the supports, growth of bubbles of the hydrogen chloride gas is suppressed. In addition, a great number of relatively fine bubbles remain even at the upper part of the reactor. Accordingly, there is an increase in contact area (surface area) between hydrogen chloride gas and the Me-Si which improves the reaction efficiency.

Also a heat transfer tube can be provided in the annular space outward from the internals, or baffles, so that the upward flow that occurs at the center of the reactor is likely to collide with the baffles connected to supports and the baffles are easily worn. On the contrary, if the heat transfer tube is installed in the annular space that avoids the upward flow, it is less likely to become worn. In addition, if the heat transfer tube is installed to stand close to the inner peripheral wall of the reactor, the inner wall of the reactor is less likely to be influenced by corrosion caused by the hydrogen chloride gas. In addition, baffles connected to supports may be for example, a chain, cord, cable, or the like typically made of metal, coated metal or wear resistant material. In this case, the baffles themselves do not circulate a heating medium unlike the heat transfer tube, and it can easily be replaced with a new member while the erosion thereof is low.

In the apparatus for producing trichlorosilane having the above-mentioned configuration, when the reactor is assembled, the baffles connected to supports are positioned in and through the reactor from above. Accordingly, the assembling operation is simple, and maintenance such as replacement of the internals, or baffles, can be easily performed. In the case where the baffles connected to supports is held so as to be inserted into the reactor, the baffles connected to supports may be directly held to the supports, or may be held via a support frame or the like. The baffles connected to supports may be fixed to the supports by any fixing means or soldering, for example.

In the apparatus for producing trichlorosilane of the present invention, a large diameter portion, greater in diameter than the body of the reactor, is connected to the top of the body of the reactor. Trichlorosilane gas generated in the reactor is discharged from the upper end of the reactor. It is, however, necessary to prevent as much Me-Si, a composition of the fluidized bed, as possible from being discharged from a discharge port of the trichlorosilane gas. The large diameter portion is disposed at the upper part of the reactor, by which upward flows are decreased in speed and the Me-Si ascending together with the upward flow freely falls into the downward flow. Therefore, it is possible to reduce the collision force of the Me-Si at the upper end of the heat transfer tube protruding inward in the radial direction of the large diameter portion, thereby preventing erosion. In addition, the baffles connected to supports may be arranged so that the upper end is equal in height to the lower end of the large diameter portion or may be kept lower to such an extent that they will not reach the large diameter portion. The inner diameter of the large diameter portion is preferably in a range from about 1.3 to about 1.6 times with respect to the inner diameter of the lower part of the reactor.

The method for producing trichlorosilane of the present invention comprises providing a plurality of internals or baffles connected to supports in the central space of the reactor along the vertical direction, optionally providing a heat transfer tube in an annular space enclosing the central space of a reactor along a vertical direction, passing a heating medium through the heat transfer tube, supplying Me-Si as a raw material to the reactor, introducing hydrogen chloride gas to the reactor from below to react with the Me-Si while the Me-Si is fluidized by the hydrogen chloride gas and the Me-Si and hydrogen chloride gas flow upward between the internals, and discharging gas containing trichlorosilane from a top part of the reactor.

In the apparatus and method for producing trichlorosilane, the growth of bubbles of hydrogen chloride gas is suppressed by the baffles connected to supports to make the hydrogen chloride gas contribute effectively to a reaction even at the upper part of the rector, thereby attaining a higher reaction efficiency.

DETAILED DESCRIPTION OF THE INVENTION

Figure 1:
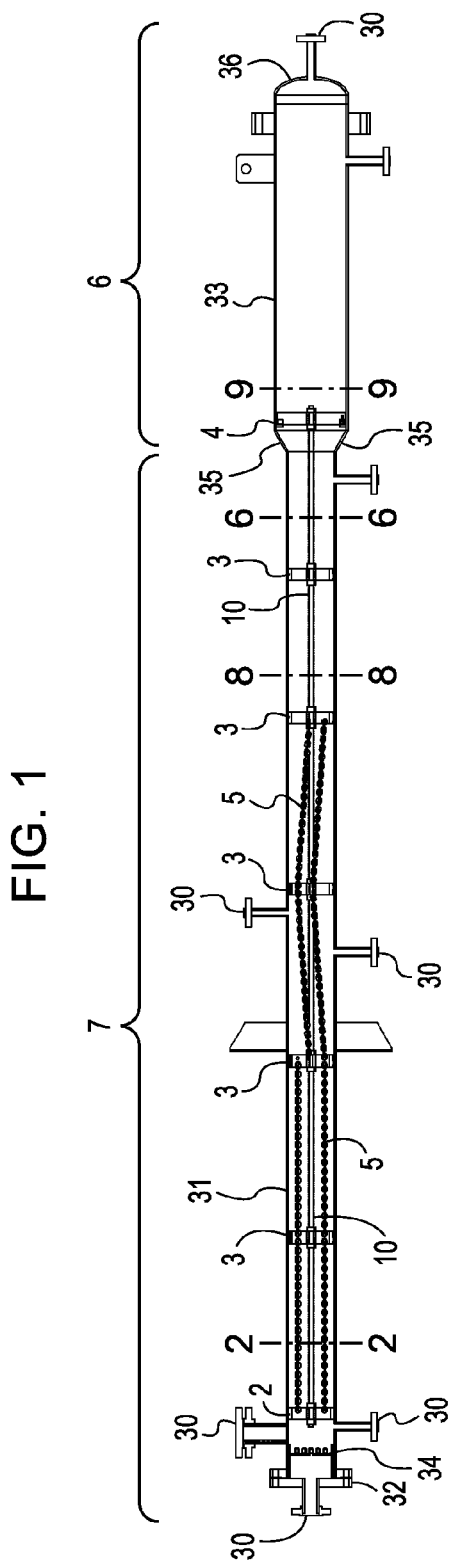
FIG. 1 is a vertical cross-sectional view along a length of a reactor.

Hereinafter, an explanation will be made of an embodiment of the present invention with reference to the drawings.

An apparatus for producing trichlorosilane is provided with a reactor, raw material supply device for supplying Me-Si as a raw material to the reactor, a feed gas introduction device for introducing hydrogen chloride gas which reacts with the Me-Si, and a gas discharge device for discharging the generated gas containing trichlorosilane.

The reactor is provided with a body formed substantially in a straight cylindrical shape along the vertical direction, a bottom connected to the lower end of the body, and a large diameter portion connected coaxially to the upper end of the body. In this embodiment, the body is formed with a substantially similar diameter to the bottom and the space therebetween is partitioned by a horizontal distributor plate. On the other hand, a tapered portion is formed at the upper part of the body, and the large diameter portion is integrally connected to the upper end of the tapered portion. The diameter of the tapered portion gradually increases in the upper direction thereof. Thus, the internal space of the body is communicatively connected to that of the large diameter portion.

The raw material supply device supplies Me-Si, for example, the size is 1 μm or more and 1000 μm or less, from a raw material feed hopper (not shown) via a raw material supply tube (not shown) connected to the lower part of the body of the reactor. In this configuration, the Me-Si is supplied by gas transportation using hydrogen as a carrier gas.

On the other hand, the feed gas introduction device (not shown) introduces hydrogen chloride gas into the bottom of the reactor via a gas supply tube (not shown).

A plurality of nozzles (not shown) are fixed along the vertical direction so as to penetrate the distributor plate which partitions the bottom of the reactor from the body. The upper end openings of the nozzles are arranged inside the body and the lower end opening is arranged inside the bottom. Then, hydrogen chloride gas introduced by the feed gas introduction device into the bottom of the reactor is ejected dispersively into the body by each of the nozzles.

Further, dispersing materials formed in spheres of various sizes and plate-shaped pieces of various sizes and dimensions with holes or the like are laid densely on the distributor plate to further disperse the gas.

The gas discharge device sends the reacted fluid including trichlorosilane discharged from the reactor to a gas purifying system via dust/gas separation devices (not shown), and collects the Me-Si fine powder (for example, the diameter is 1 μm or more and 200 μm or less) discharged along with the reacted fluid in the dust/gas separation devices to be returned to the raw material feed hopper via a recovery tube or for disposal.

The feed gas introduction device introduces hydrogen chloride gas into the bottom of the reactor via the gas supply tube. The feed gas must be heated from about 450° C. to greater than about 600° C. Target reaction temperature of greater than 550° C. must be achieved as bulk reaction temperature. Gas temperature out of the heater must be hotter to account for: achieving target temperature; endothermic reaction; thermal loss in reactor bed; and additional thermal loss in heater section. The size of the heater is determined by the desired throughput.

To make internals of the present invention useful for minimizing bubble size in a bubbling fluidized bed reactor and to overcome the drawbacks of the prior art, the internals are designed to effectively minimize bubble size to increase reactor conversion, remain fully adjustable for optimization of configuration, minimize physical footprint to keep reactor yield high, minimize mechanical wear on the reactor walls from impact, and maximize ease of assembly outside of reactor for drop-in installation convenience.

Reactor conversion in a bubbling fluidized bed reactor is a function of the bubble size (gas pockets formed in the solid fluidized catalyst/reactant). As the bubble size increases, conversion drops, most often exponentially. For tall bubbling fluidized bed reactors, it is assumed that the bubble size will reach a size in diameter equal to the maximum channel size (essentially the diameter of the reactor). This will be true unless a baffle is present to interrupt the flow of a bubble along the vertical baffle channels inside the reactor.

FIG. 1 is a vertical cross-sectional view along a length of a reactor 1, in this case a fluidized bed reactor, having internal elements along the length of the reactor 1 for minimizing bubble size and increasing reactor conversion. Among the internal elements of the invention there are an internals horizontal bottom support 2 (bottom support 2), an internals horizontal intermediate supports 3 (intermediate supports 3) and an internals horizontal top support 4 (top support 4). The bottom support 2, intermediate supports 3 and top support 4 are horizontal baffles which support vertically extending baffles. Between and attached to the bottom support 2, the intermediate supports 3 and the top support 4 are vertically extending internals or baffles 5. The reactor 1 in this embodiment has two main sections with each section having a different diameter. The reactor 1 has a top section 6 with a first diameter and a bottom section 7 with second diameter, with the second diameter being smaller than the first diameter. Along the reactor 1 are ports 30 for the inlet and outlet of reactants and reacted products. The bottom support 2, the intermediate supports 3 and the top support 4 are all attached to a center cable 10 running the length of reactor 1, or at least running the length from the bottom support 2 to the top support 4.

The reactor 1 is provided with a body 31 formed substantially in a straight cylindrical shape along the vertical direction, a bottom 32 connected to the lower end of the body 31, and a large diameter portion 33 connected coaxially to the upper end of the body 31. In this embodiment, the body 31 is formed with a substantially similar diameter to the bottom 32 and the space there between is partitioned by a horizontal partition plate 34. On the other hand, a tapered portion 35 is formed at the upper part of the body 31, and the large diameter portion 33 is integrally connected to the upper end of the tapered portion 35. The diameter of the tapered portion 35 gradually increases in the upper direction thereof. Thus, the internal space of the body 31 is communicatively connected to that of the large diameter portion 33. The reactor 1 has a top 36 attached to and enclosing the large diameter portion 33. In this embodiment, the inner diameter of the large diameter portion 33 is set to be about 1.3 to about 1.6 times greater than the inner diameter of the body 31. For example, the inner diameter of the body 31 is about 1.6 m, and the inner diameter of the large diameter portion 6 is about 2.3 m.

Figure 2:
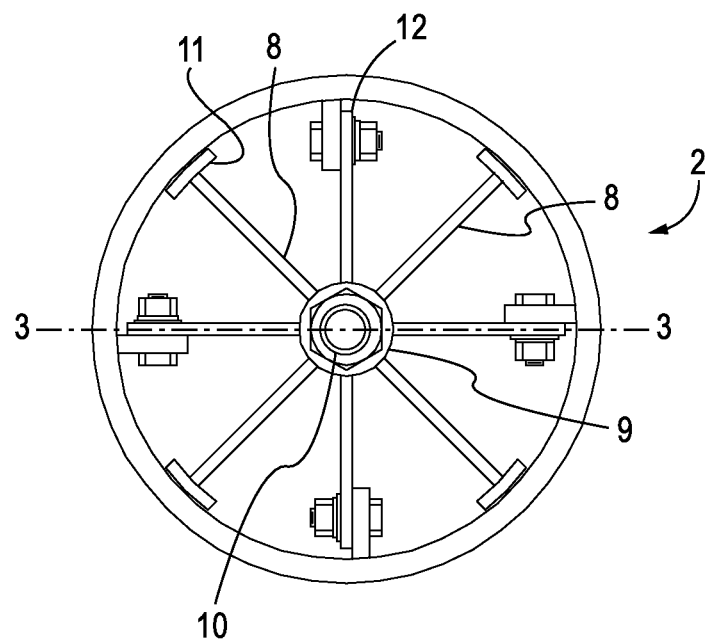
FIG. 2 is a horizontal cross-sectional view along line 2-2 looking toward an internals bottom support.
Figure 4:
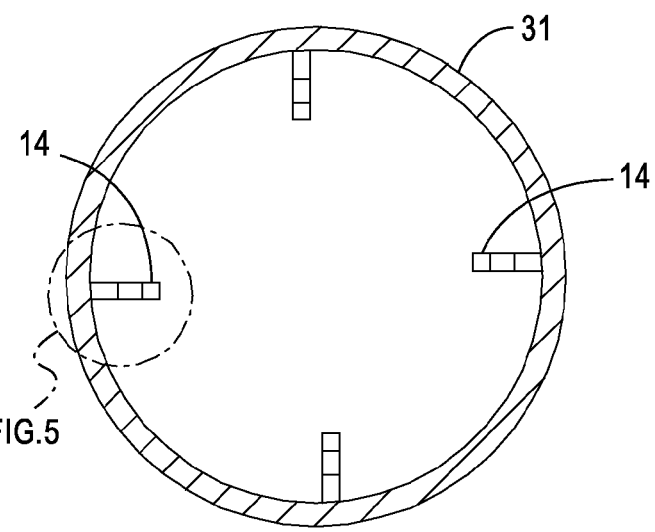
FIG. 4 is a horizontal cross-sectional view of a reactor along line 2-2 without the internals bottom support.
Figure 5:
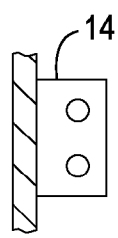
FIG. 5 is a bolt support on the inside of the reactor.

FIG. 2 is a horizontal cross-sectional view of a reactor along line 2-2 just above bottom support 2. Bottom support 2 has a center guide sleeve 9 from which extend eight arms 8. The bottom support 2 can have any number of arms which stabilize the bottom support 2 inside reactor 1 and provide sufficient attachment locations for baffles 5. However, in this embodiment, the bottom support 2 has eight arms 8 evenly spaced at 45° from each other around the circumference of the center guide sleeve 9. In this embodiment, four of the arms 8 each have a guide end plate 11 at the distal end, farthest from the center guide sleeve 9, of the arm 8 and the other four arms 8, not having the guide end plate 11, have a reactor attachment end 12 which can attach to the inside of reactor 1. In this case each of four reactor attachment ends 12 can be attached to the inside of reactor 1 by a bolt 13 which is threaded through a hole 18 on arm 8 to a bolt support 14 on the inside of reactor 1 (shown in FIG. 5). As shown in FIGS. 4 and 5, each bolt support 14 can be permanently affixed or welded to the inside of reactor 1 for the purpose of receiving each of the reactor attachment ends 12 of bottom support 2. In this case, the bolt 13 is used to connect each of four reactor attachment ends 12 of bottom support 2, however other means for attaching such as pins, clamps, rods, interconnecting parts, screws, nails, wedges or any other known connecting mechanism.

Figure 3:
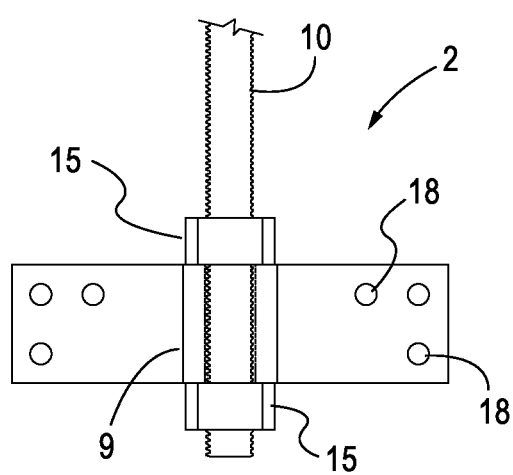
FIG. 3 is a vertical cross-sectional view of the internals bottom support along line 3-3.

FIG. 3 is a vertical cross-sectional view of the bottom support 2 along line 3-3 which is located at the arms 8 having the reactor attachment ends 12. In this embodiment, the bottom support 2 is symmetrical with each of the arms 8 having reactor attachment ends 12 being directly opposite from other arms having reactor attachment ends 12 and each of arms 8 having guide end plates 11 being directly opposite from another arm 8 having a guide end plate 11.

FIG. 3 also shows a vertical cross-sectional view of the center cable 10. The center cable 10 is a line running from the top 36 to the bottom 32 of reactor 1 or at least from a location in the top section 6 to a location in the bottom section 7. In this case, center cable 10 is an all-thread rod which is a rod with screw threads along the length. As shown in FIG. 3, the bottom support 2 is threaded or screwed onto center cable 10 because center guide sleeve 9 is reciprocally threaded to fit onto center cable 10. Thus the precise location of the bottom support 2 can be set and adjusted by simply turning the bottom support 2 left or right so that it moves up or down the center cable 10. A hex nut 15 is placed above and below the bottom support 2 on the center cable 2 in order to set or fix the bottom support 2 in a static location. Hex nuts 15 above and below the bottom support 2 will need to be moved in order to move or adjust the bottom support 2.

Figure 6:
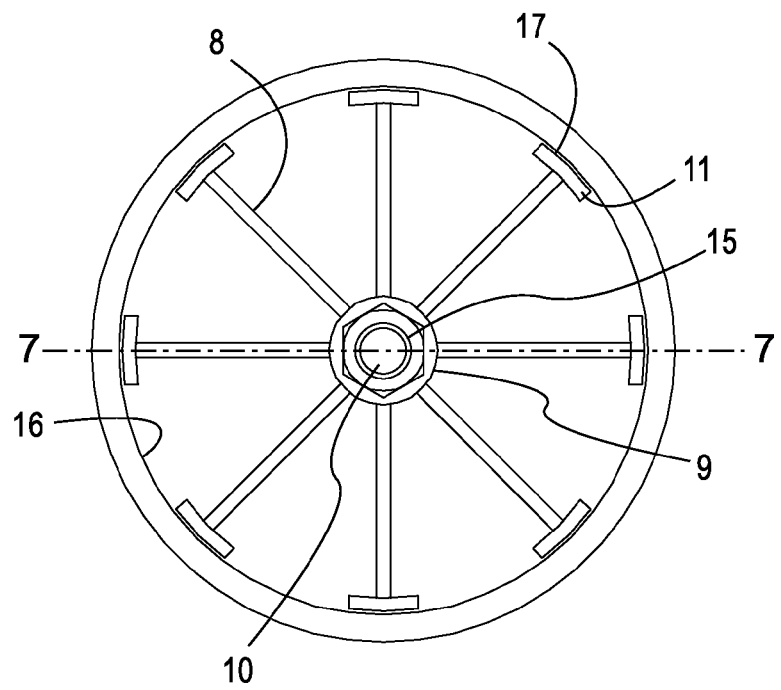
FIG. 6 is a horizontal cross-sectional view of a reactor along line 6-6 looking toward an internals intermediate support.

FIG. 6 is a horizontal cross-sectional view of a reactor 1 along line 6-6 showing the intermediate support 3 which has eight arms 8 each having the guide end plate 11 at the distal end farthest from center guide sleeve 9. The center guide sleeve 9 is threaded onto the center cable 10 and the intermediate support 3 is set in a static location along the center cable 10 by two hex nuts 15, one above and one below, the intermediate support 3 with the hex nuts 15 contacting the center guide sleeve 9. The intermediate support 3 is symmetrical with eight arms 8, one located every 45° around the circumference of the center guide sleeve 9 from which the eight arms extend. There is a gap 17 between each of the guide end plates 11 and an interior wall 16 of the reactor 1. Thus the diameter from the outer surface of one guide end plate 11 on the first arm 8 to the outer surface of another guide end plate 11 on the second arm 8 directly opposed to the first arm 8 is less than the diameter of the interior of the reactor 1 where the intermediate support 3 is located, in this case in the bottom section 7 of the reactor 1. The gap 17 exists between all guide end plates 11 on all arms 8 and the interior wall 16 of the reactor 1.

Figure 7:
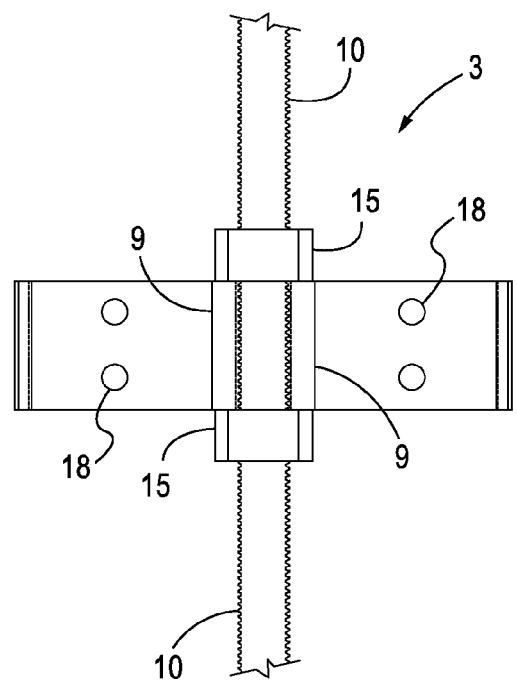
FIG. 7 is a vertical cross-sectional view of an internals intermediate support along line 7-7.

FIG. 7 is a vertical cross-sectional view of the intermediate support 3 along line 7-7 attached to center cable 10. The arms 8 of the intermediate support 3 have holes 18 located on the arms for the attaching baffles 5. In the embodiment shown in FIG. 8, the holes 18 are located midway on the arm between the center guide sleeve 9 and the guide end plate 11. The holes can be replaced with other means for attaching baffles 5 like hooks, loops, springs, latches, clamps, projections extending away from the arms 8, pins, bars, rods, etc.

Figure 8:
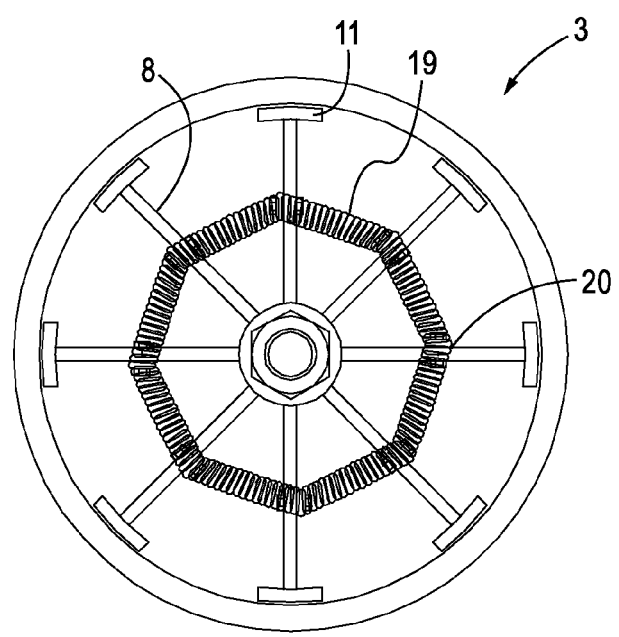
FIG. 8 is a horizontal cross-sectional view of a reactor along line 8-8 looking toward an internals top support.

FIG. 8 is a horizontal cross-sectional view of the reactor 1 along line 8-8 showing the intermediate support 3 with bars 19 connecting all arms 8 at the radial midpoint 20, between the center sleeve 9 and the guide end plate 11, of arms 8. The bars 19 are can be used to attach baffles 5 at any location along the bars 19.

In the embodiment of FIG. 1 there are five intermediate supports 3 along the length of the bottom section 7 of reactor 1. There can be zero, only one, or a plurality of intermediate supports 3 along the length of reactor 1. The number of intermediate supports used depends on the configuration of the all internals in the reactor 1, including baffles 5, and is of a proper number when bubble size in the reactor is sufficiently minimized and reaction conversion in the reactor is sufficient. A common number of intermediate supports is in the range from 0 to 10, including 1, 2, 3, 4, 5, 6, 7, 8 and 9.

Figure 9:
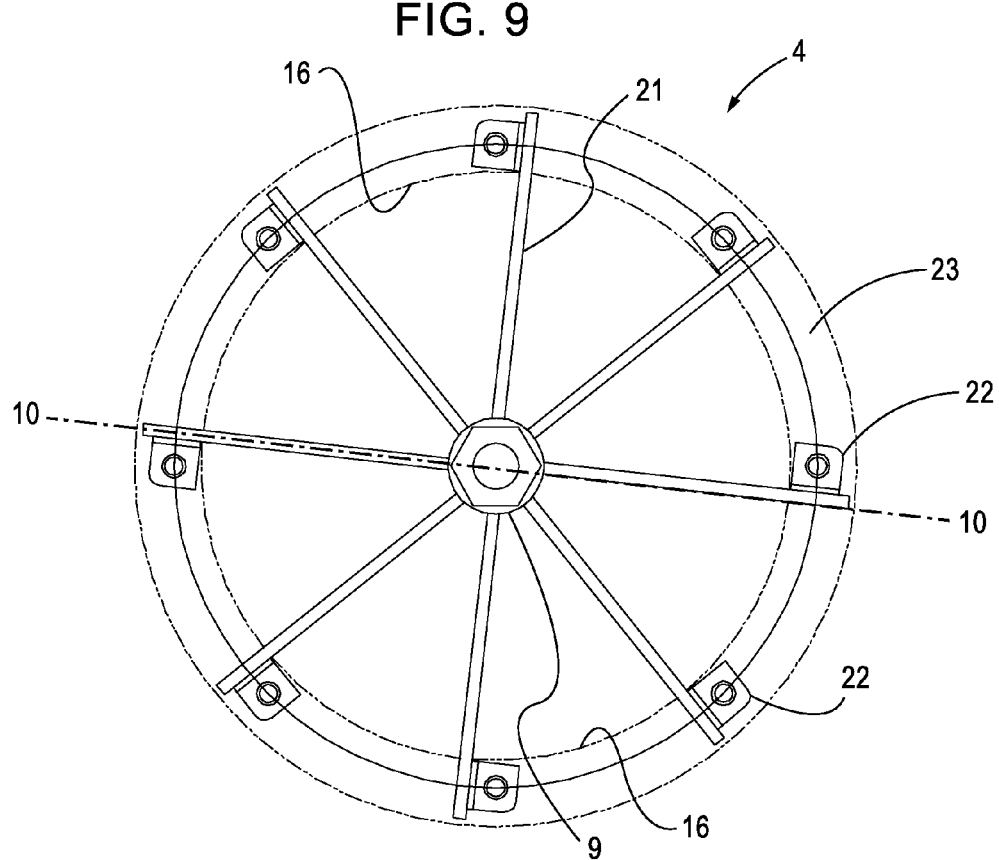
FIG. 9 is a horizontal cross-sectional view of a reactor along line 9-9 looking toward an internals intermediate support.

FIG. 9 is a horizontal cross-sectional view of the reactor 1 along line 9-9 showing the upper support 4. In this embodiment, the upper support 4 has eight arms 21 extending from the center guide sleeve 9 to a point beyond the interior wall 16 of the bottom section 7 of reactor 1. Each of the eight arms 21 have an attachment end 22 for attaching the upper support 4 to the wall of the upper section 6 of the reactor 1. Since the upper section 6 of the reactor 1 has a larger diameter than the lower section 7 of the reactor 1, the upper support 4 can be attached such that it rests on an interior wall 23 of the upper section 6. The upper support 4 can be attached to the upper section 6 of the reactor 1 by any number of means including bolts, pins, rods, hooks, lamps, locks, etc. In this case the attachment ends 22 are attached to the interior wall 23 of the upper section of the rector 1 by tapered guide pins 24.

Figure 10:
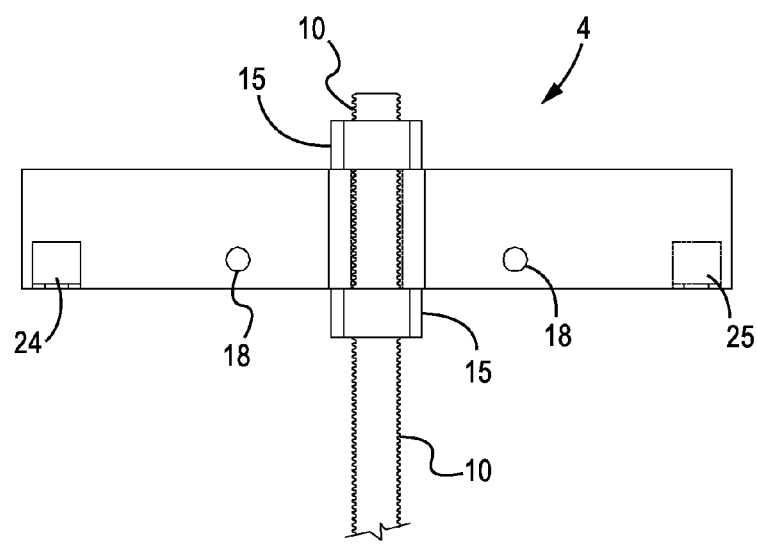
FIG. 10 is a vertical cross-sectional view of an internals top support along line 10-10.

FIG. 10 is a vertical cross-sectional view of the top support 4 along line 9-9 threaded onto center cable 10 and held into place by two hex nuts 15 one above and one below the center guide sleeve 9. Each of the eight arms 21 have the hole 18 for the attachment of baffles 5. Each of the eight arms 21 also have a guide pin tab 25 to engage the tapered guide pins 24 affixed to the upper section 6 of the reactor 1 in order to hold the upper support 4 in place.

Figure 11:
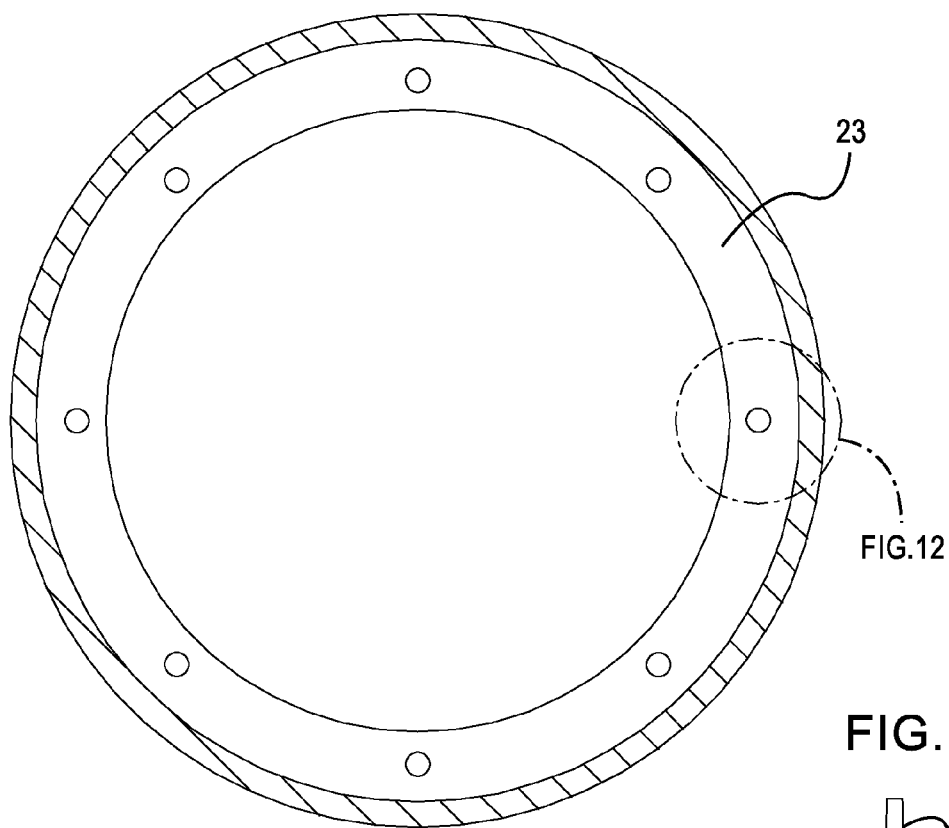
FIG. 11 is a horizontal cross-sectional view of a reactor along line 9-9 without the internals top support.
Figure 12:
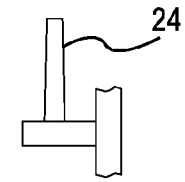
FIG. 12 is a cross-sectional view of a tapered guide pin.

FIG. 11 is a horizontal cross-sectional view of the reactor 1 along line 9-9 without the top support and showing the top of the tapered guide pins 24 (shown in FIG. 11) for engaging the guide pin tabs 25 located on each arm 21 of upper support 4. The eight tapered guide pins 24 are located 45° apart around the circumference of the upper section 6 of the reactor 1 to engage each of the guide pin tabs 25 on each one of the arms 21 of upper support 4. The number of tapered guide pins 24 will depend on the number of guide pin tabs 25 on the upper support 4. In this embodiment there are eight guide pin tabs 25 so there are eight tapered guide pins 24.

Figure 13:
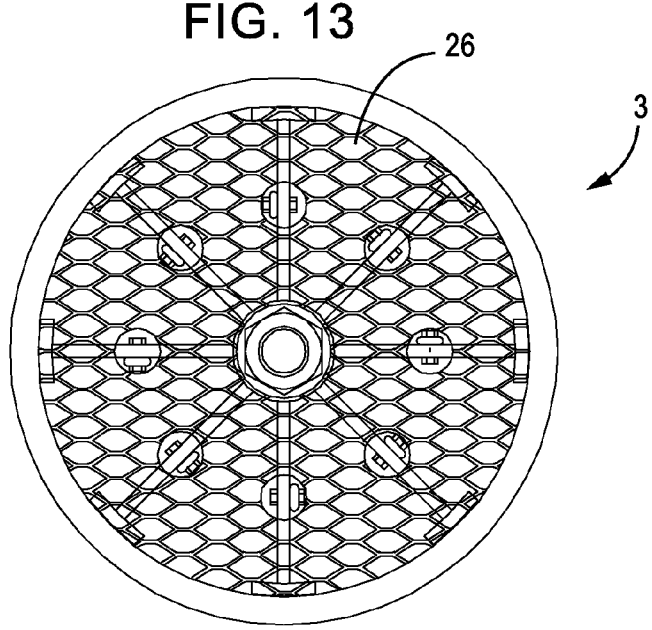
FIG. 13 is a horizontal cross-sectional view of a reactor along line 7-7 with a mesh plate attached to the internals intermediate support.

FIG. 13 is a horizontal cross-sectional view of the reactor 1 along line 6-6 with a plate attached to the intermediate plate 3. The embodiment of FIG. 13 shows a plate 26 with a mesh design on the top or bottom, or both the top and bottom, of the intermediate support 3. The plate 26 can be of any design configured to break bubbles rising in the reactor 1 into smaller bubbles. In this case a mesh pattern shown on plate 26 is for breaking bubbles larger than the holes on the mesh pattern into smaller bubbles so that the bubbles can pass through the holes in the mesh. Again the plate pattern can be any mesh or hole pattern or hole design or shape for creating smaller bubbles from larger ones. The plate 26 can be placed on either the top or bottom or both the top and the bottom of the intermediate support 3. The holes of the mesh pattern can be any shape including circular, oval, square, rectangular, and polygonal.

The baffles 5 extend between the upper support 2, the intermediate supports 3 and the upper support 4 and are connected at different location points thereon, particularly at holes 18, in this embodiment. The baffles 5 can be any type of baffle which can extend between the upper support 2, the intermediate supports 3 and the upper support 4 and in this embodiment are link chains. The baffles 5 can be cables; chains; coils; cords; hinged rods; rods; springs; rods and chains or coils in a linear arrangement connected end to end; an arrangement of any of the cables, chains, coils, cords, hinged rods, rods, and springs, connected together between the internals top support 4 and the internals bottom 2 support and any intermediate support 3 in between. The baffles of this embodiment are chains, made of metal links or coated metal links. The baffles are made of a grade of material appropriate for the reactor size and the reaction environment.

A fluidized bed reactor is one example of the implementation of this invention. Internal guides and supports double as horizontal baffles. They are held in place by bolts on a piece of all thread that runs the length of the reaction chamber. The top support has holes that align to pins on the reactor. This allows the assembled internal assembly to be easily lowered into the reactor and to be properly aligned. The bottom support attaches to clips welded to the reactor to stabilize the instillation. The top support and bottom support are required for mechanical stability; however, all the other guides (horizontal baffles) are fully adjustable for the height at which they are located in the reactor and the position the horizontal baffles take in the axial position. There are many benefits to this design. The vertical position of the vertical baffles in the reactor can be optimized to minimize bubble size. The adjustability of vertical position also allows placement of the guides away from mechanical obstructions such as inlet piping and instrumentation. In addition, the axial position of the baffles can be rotated relative to each other (for example 22.5°) so that bubbles that form in the channels between vertical baffles (chains) are broken-up when they reach the next guide. The rate of bubble coalescence is a function of the reactor size and catalyst/reactant particles. If it is found that the bubbles do not significantly coalesce before a certain height in the reactor, horizontal baffles and their associated vertical baffles may be removed from sections. The increased reactor volume can increase product yield and removes parts from the mechanical abrasion of the fluidized bed. The end of the horizontal baffles are welded to an end plate which is rolled to match the inner diameter of the vessel. This significantly decreases the mechanical impacting of the internals on the reactor wall. Finally, the adjustability of vertical position during assembly allows for slight axial adjustments that will keep maximum tension on the vertical baffles or chains. The chains will be prevented from swaying into the reactor walls.

Chains are run from one horizontal baffle to the next and are attached to holes in the horizontal support (or horizontal baffle plate). Chains are advantageous as vertical baffles over other technologies like heat exchanger tubing for several reasons. The chains are easily run from each horizontal support even when they are rotated in the axial position relative to one another. Also, a chain is as or nearly effective as a tube of equivalent diameter while occupying less footprint for increased reactor yield.

The invention and embodiment are described for illustrative, but not limitative purposes. It is to be understood that changes and/or modifications can be made by those skilled in the art without for this departing from the related scope of protection, as defined by the enclosed claims.

What is claimed is:

1. A reactor with internals for minimizing bubble size comprising:
    a reactor with a top, a bottom, and walls between the top and the bottom defining an internal space;
    a center support in the center of the reactor extending vertically from a bottom part of the reactor to a top part of the reactor;
    a horizontal top support connected to the center support at the top part of the reactor;
    a horizontal bottom support connected to the center support at the bottom part of the reactor;
    a horizontal intermediate support connected to and rotatably adjustable on the center support between the horizontal top support and the horizontal bottom support; and
    vertically extending internals selected from the group consisting of cables; chains; coils; cords; hinged rods; rods; springs; rods and chains or coils in a linear arrangement connected end to end; and an arrangement of any of the cables, chains, coils, cords, hinged rods, rods, and springs, connected together; extending among the horizontal top support, the horizontal intermediate support and the horizontal bottom support.

2. The reactor with internals for minimizing bubble size according to claim 1, wherein the vertically extending internals are chains.

3. The reactor with internals for minimizing bubble size according to claim 1, wherein the horizontal bottom support is connected to the reactor by a plurality of bolts each extending through an arm of the horizontal bottom support to a bolt support member connected to a reactor wall.

4. The reactor with internals for minimizing bubble size according to claim 1, wherein the horizontal top support is connected to the reactor by a plurality of tapered guide pins each extending through arms of the horizontal top support from a location on a reactor wall.

5. The reactor with internals for minimizing bubble size according to claim 1, wherein the center support is an all thread rod.

6. A method of minimizing bubble size in a fluidized bed reactor comprising:
    providing a reactor with internals for minimizing bubble size comprising:
        a reactor with a top, a bottom, and walls between the top and the bottom defining an internal space;
        a center support in the center of the reactor extending vertically from a bottom part of the reactor to a top part of the reactor;
        a horizontal top support connected to the center support at the top part of the reactor;
        a horizontal bottom support connected to the center support at the bottom part of the reactor;
        a horizontal intermediate support connected to and rotatably adjustable on the center support between the horizontal top support and the horizontal bottom support; and
        vertically extending internals selected from the group consisting of cables; chains; coils; cords; hinged rods; rods; springs; rods and chains or coils in a linear arrangement connected end to end; and an arrangement of any of the cables, chains, coils, cords, hinged rods, rods, and springs, connected together; extending among the horizontal top support, the horizontal intermediate support and the horizontal bottom support,
    supplying metallurgical grade silicon as a raw material to the reactor,
    introducing hydrogen chloride gas to the reactor to react with the metallurgical grade silicon while the metallurgical grade silicon is fluidized by the hydrogen chloride gas and the metallurgical grade silicon and hydrogen chloride gas flow upward in the reactor, and
    discharging gas containing trichlorosilane from a top part of the reactor.

* * * * *